US008147025B2

(12) United States Patent
Morishita

(10) Patent No.: US 8,147,025 B2
(45) Date of Patent: Apr. 3, 2012

(54) IMAGE FORMING APPARATUS AND STORAGE MEDIUM STORING DIAGNOSTIC PROGRAM USED THEREWITH

(75) Inventor: Takashi Morishita, Atsugi (JP)

(73) Assignee: Ricoh Company Limited, Tokyo (JP)

( * ) Notice: Subject to any disclaimer, the term of this patent is extended or adjusted under 35 U.S.C. 154(b) by 457 days.

(21) Appl. No.: 12/400,235

(22) Filed: Mar. 9, 2009

(65) Prior Publication Data

US 2009/0225126 A1 Sep. 10, 2009

(30) Foreign Application Priority Data

Mar. 10, 2008 (JP) ................................ 2008-058891

(51) Int. Cl.
*B41J 29/393* (2006.01)
*B41J 2/175* (2006.01)
*G01M 3/04* (2006.01)
*G01M 3/34* (2006.01)

(52) U.S. Cl. ................ 347/19; 347/85; 73/40; 73/49.2; 73/49.3

(58) Field of Classification Search .................... 347/19, 347/85; 73/40
See application file for complete search history.

(56) References Cited

U.S. PATENT DOCUMENTS

2006/0209142 A1 * 9/2006 Kachi ............................ 347/85
2008/0225070 A1 9/2008 Morishita et al.

FOREIGN PATENT DOCUMENTS

JP 2007-15153 1/2007

* cited by examiner

*Primary Examiner* — Julian Huffman
*Assistant Examiner* — Jason Uhlenhake
(74) *Attorney, Agent, or Firm* — Oblon, Spivak, McClelland, Maier & Neustadt, L.L.P.

(57) ABSTRACT

An image forming apparatus includes a printhead, an ink container, a sensor, a memory, and a processor. The printhead ejects droplets of ink to form an ink image. The ink container supplies ink to the printhead. The sensor detects an air leak in the ink container when an amount of air therewithin exceeds a given limit level. The memory records a count of air leaks detected by the sensor during a given counting cycle initiated at a given start time and completed following a lapse of a given period of time. The processor compares the detection count against a given threshold value upon completion of the counting cycle, and indicates a defect in the ink container when the detection count exceeds the given threshold value. A storage medium storing a computer-executable diagnostic program for use in such an image forming apparatus is also disclosed.

8 Claims, 8 Drawing Sheets

IMAGE FORMING APPARATUS AND STORAGE MEDIUM STORING DIAGNOSTIC PROGRAM USED THEREWITH

CROSS-REFERENCE TO RELATED APPLICATIONS

The present patent application claims priority pursuant to 35 U.S.C. §119 from Japanese Patent Application No. 2008-058891 filed on Mar. 10, 2008, the contents of which are hereby incorporated by reference herein in their entirety.

BACKGROUND OF THE INVENTION

1. Field of the Invention

The present invention relates to an image forming apparatus and a storage medium storing a diagnostic program used therewith, and more particularly, to an inkjet image forming apparatus that employs an ink container to supply ink liquid to a printhead for ejecting ink droplets, and a storage medium storing a computer-executable diagnostic program for use in such an image forming apparatus.

2. Discussion of the Background

Inkjet printing is widely used in various image forming apparatuses, such as printers, facsimiles, photocopiers, plotters, and multifunctional machines having image forming capabilities, in which an ink image is formed by a movable printhead ejecting droplets of ink through multiple nozzles onto a recording medium or recording sheet conveyed below the printhead.

In common inkjet printers, the printhead is integrated with a subtank or ink container defining an ink chamber, which serves to hold ink received from a replaceable ink cartridge mounted on the printer body and immediately supply ink as needed by the printhead during printing. Typically, such a subtank is equipped with a pressure generator that generates a negative pressure or back pressure lower than the atmospheric pressure within the ink chamber and its associated printhead. This negative pressure prevents ink from leaking or dripping by gravity from the printhead, thereby maintaining proper ink ejection and good imaging performance of the inkjet printer.

For example, one conventional inkjet printer employs an open-sided subtank having an elastic film to cover its open side to define a sealed ink chamber therein, and a spring to bias the elastic film outward from within the ink chamber. To depressurize the ink chamber, the printer fills the ink chamber with ink, hermetically sealing the ink chamber by closing its opening, and discharges a certain amount of ink through the printhead with the biasing spring maintaining the original volume of the ink chamber.

It is known that the negative pressure generated in an ink chamber of a subtank tends to dissipate as air leaks into the subtank from the atmosphere over time. Upon detecting air leak and pressure loss in the ink chamber, the conventional printer automatically performs the depressurizing process so as to maintain a good level of negative pressure in the subtank and good ink ejection by the printhead.

However, one drawback of such a conventional method is that handling air leakage by pressure generation is ineffective where the air leak results from a mechanical defect in the subtank, such as even a small amount of foreign matter lodged in a ventilation valve to unseal the ink chamber, a loose connection between a supply tube and the ink chamber, or cracks or flaws in worn parts forming the ink chamber, etc., which allows air to continually leak into the ink chamber and immediately dissipate a generated negative pressure. In such cases, automatically repeating pressure generation only increases amounts of wasted ink and time, resulting in significant inconvenience to the user of the conventional image forming apparatus.

SUMMARY OF THE INVENTION

Exemplary aspects of the present invention are put forward in view of the above-described circumstances, and provide a novel image forming apparatus that employs an ink container to supply ink liquid to a printhead for ejecting ink droplets.

Other exemplary aspects of the present invention provide a novel storage medium storing a computer-executable diagnostic program for use with an image forming apparatus that employs an ink container to supply ink liquid to a printhead for ejecting ink droplets.

In one exemplary embodiment, the novel image forming apparatus includes a printhead, an ink container, a sensor, a memory, and a processor. The printhead ejects droplets of ink to form an ink image. The ink container supplies ink to the printhead. The sensor detects an air leak in the ink container when an amount of air therewithin exceeds a given limit level. The memory records a count of air leaks detected by the sensor during a given counting cycle initiated at a given start time and completed following a lapse of a given period of time. The processor compares the detection count against a given threshold value upon completion of the counting cycle, and indicates a defect in the ink container when the detection count exceeds the given threshold value.

In one exemplary embodiment, the storage medium stores a program that causes a computer to perform a diagnostic method for use in an image forming apparatus. The image forming apparatus includes a printhead, an ink container, and a sensor. The printhead ejects droplets of ink to form an ink image. The ink container supplies ink to the printhead. The sensor detects an air leak in the ink container when an amount of air therewithin exceeds a given limit level. The diagnostic method includes steps of recording, comparison, and indication. The recording step records a count of air leaks detected by the sensor during a given counting cycle initiated at a given start time and completed following a lapse of a given period of time. The comparison step compares the detection count against a given threshold value upon completion of the counting cycle. The indication step indicates a defect in the ink container when the detection count exceeds the given threshold value.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1A:
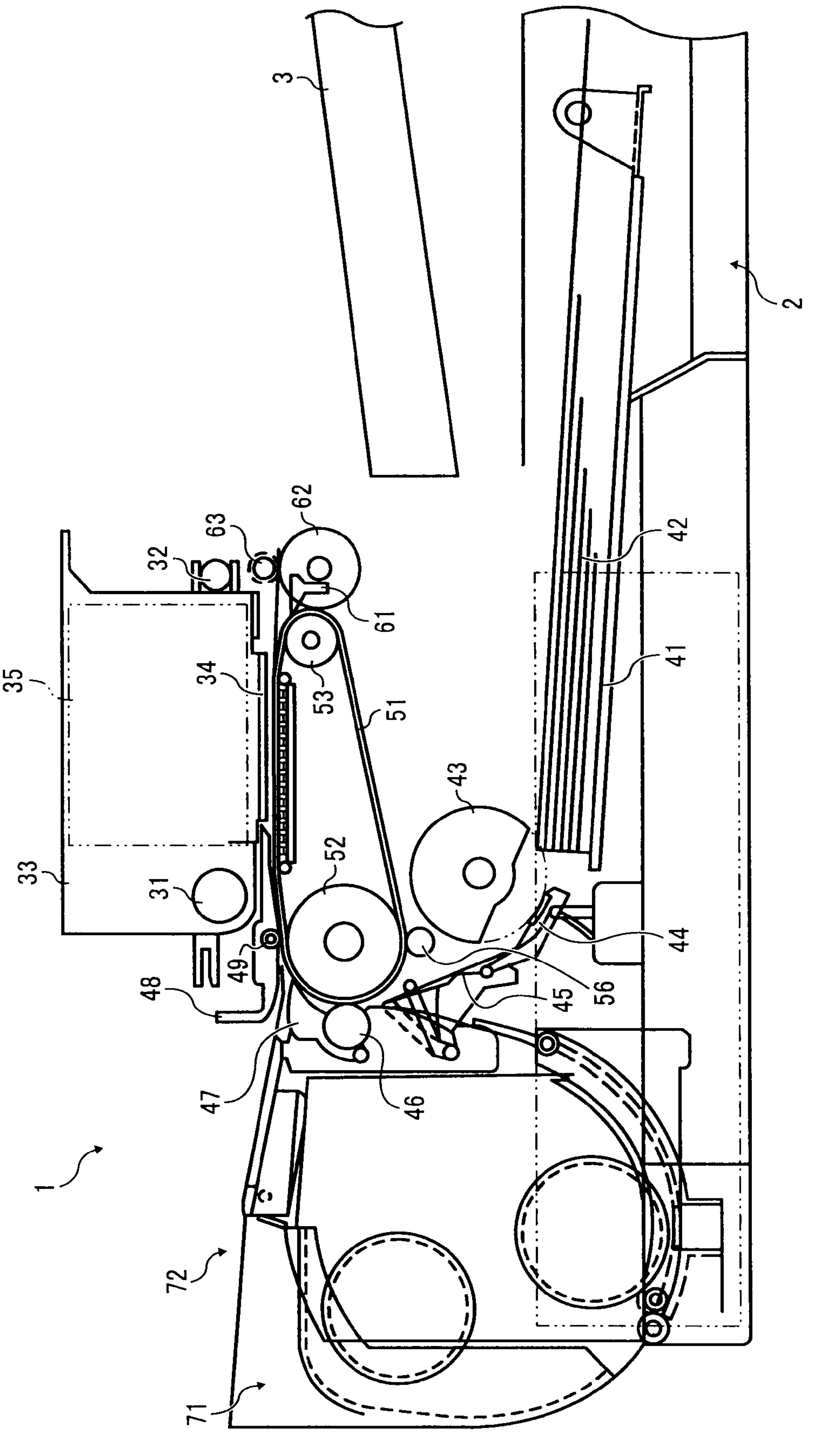
FIGS. 1A and 1B are side and partial top views, respectively, schematically illustrating an image forming apparatus according to this patent specification.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In the following discussion, the term "image" includes any visual representation of objects, including text, graphics, pictures, design, and artwork, either concrete or abstract, and the term "image formation", "imaging", or "printing" refers to production of images on recording media, including, but not limited to, paper, thread, yarn, textiles, leather, metal, plastic, glass, wood, ceramic, etc. The term "image forming apparatus" used herein refers to any system capable of producing images as set forth herein, particularly to those that perform image formation by ejecting droplets of ink onto recording media, and the term "ink" is not limited to conventional inks, but includes any material that forms liquid droplets when ejected into air, such as deoxyribonucleic acid (DNA) samples for genome analysis, photoresist for photolithography or patterning, etc.

Referring now to the drawings, wherein like reference numerals designate identical or corresponding parts throughout the several views, examples and exemplary embodiments of this disclosure are described.

Figure 1B:
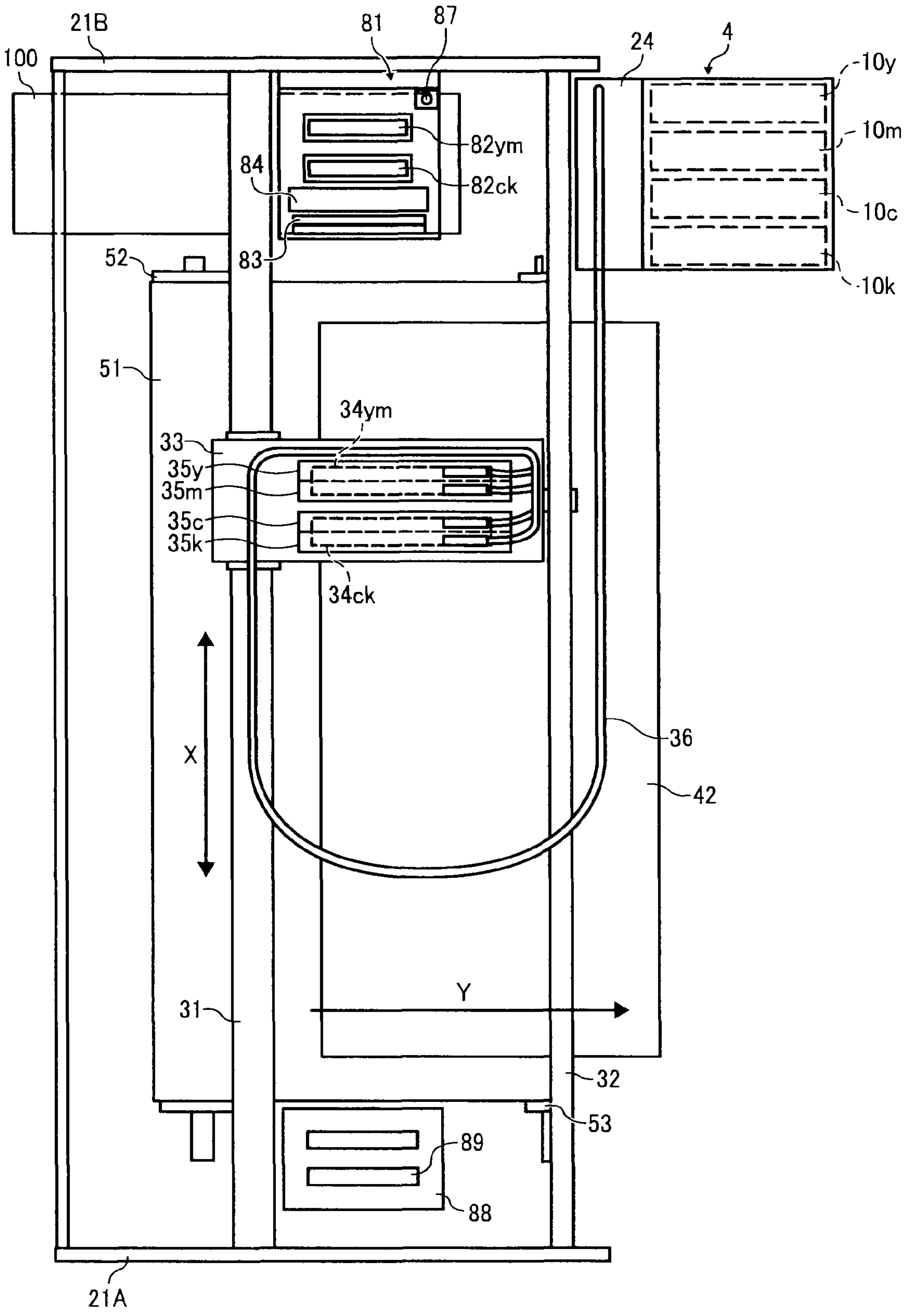

FIGS. 1A and 1B are side and partial top views, respectively, schematically illustrating an image forming apparatus 1 according to this patent specification.

As shown in FIG. 1A, the image forming apparatus 1 is a serial inkjet printer with a lower sheet feeder section and an upper printer section.

In the image forming apparatus 1, the sheet feeder section includes a sheet tray 2 to hold a stack of recording sheets 42 on a bottom board 41, from which each sheet 42 is fed with a pickup roller 43 and a separator pad 44 formed of high friction material and pressed against the pickup roller 43. The sheet feeder section also includes a guide plate 45, a counter roller 46, an edge guide 47, and a roller assembly 48 having a pressure roller 49 embedded therein, which together form a feed path along which each recording sheet 42 travels upward to the printing section for printing.

The sheet feed path defined by the guide members leads to an endless transport belt 51 on which the fed sheet 42 passes beneath the printing section during printing. The transport belt 51 is supported around a motor-driven conveyor roller 52 and a tension roller 53, with its outer surface in contact with a charge roller 56. As the conveyor roller 52 rotates clockwise in the drawing, the transport belt 51 rotates in the same direction together with the adjoining rollers 53 and 56.

At one side of the transport belt 51 is an output unit, formed of a sheet separator 61, an ejection roller 62, and a spur 63, leading to an output tray 3 on a front end of the apparatus 1. At the opposite side of the transport belt 51 is a sheet reversing unit 71 topped with a manual feed tray 72 and releasably mounted on a back end of the apparatus 1.

With additional reference to FIG. 1B, the printer section includes a carriage 33 supported by a pair of guide rods 31 and 32 extending between side walls 21A and 21B of the apparatus 1 to define a print zone above the transport belt 51. In the print zone, the carriage 33 moves reciprocally back and forth in a main scan direction X with a motor-driven timing belt, not shown, and the transport belt 51 runs in a sub-scan direction Y orthogonal to the main scan direction X with the motor-driven conveyor roller 52.

The carriage 33 contains printheads 34*ym* and 34*ck* (indicated collectively by numeral 34) combined with multiple ink containers or subtanks 35*y*, 35*m*, 35*c*, and 35*k* according to this patent specification (indicated collectively by numeral 35) disposed atop the printheads 34. The printheads 34*ym* and 34*ck* each has a bottom face with multiple nozzles, not shown, arranged parallel to the sub-scan direction Y to eject droplets of ink downward from the carriage 33. The printhead 34*ym* includes a set of two nozzle arrays, one for yellow ink and the other for magenta ink, in fluid communication with the subtanks 35*y* and 35*m*, respectively, and the printhead 34*ck* includes another set of two nozzle arrays, one for cyan ink and the other for black ink, in fluid communication with the subtanks 35*c* and 35*k*, respectively. Alternatively, instead of separate nozzle faces each having a set of nozzle arrays for two colors of ink, a single integral nozzle face having nozzle arrays for all the four colors of ink may also be used as the inkjet printhead.

As will be described later in more detail, the subtanks 35 serve to hold ink for immediate supply to the printheads 34 as needed during printing, each connected to a corresponding one of ink cartridges or main tanks 10*y*, 10*m*, 10*c*, and 10*k* detachably loaded in a cartridge holder 4, from which ink is supplied via a supply tube 36 aided by a motor-driven pump 5, not shown.

In addition, the printer section includes a maintenance station 81 with nozzle caps 82*ym* and 82*ck*, a wiper blade 83, a first spittoon 84 connected to an ink waste tank 100 replaceably mounted below the station 81, and a carriage lock 87, all located at one side of the print zone. As well, a second spittoon 88 with elongated openings 89 parallel to the nozzle arrays of the printheads 34 is disposed at the opposite side of the print zone.

During operation, the sheet feeder section first feeds the recording sheets 42 one by one with the pickup roller 43 and the separator pad 44. Each fed sheet 42 is substantially vertically oriented, and enters an entrance nip defined as where the sheet is gripped between the counter roller 46 and the conveyor roller 52, guided along the guide plate 45.

Rotating in contact with the charge roller 56, the transport belt 51 develops positively and negatively charged areas of uniform size alternately appearing along the length of its outer surface. This recurring pattern of electric charges is created by applying an alternating voltage, i.e., a voltage with polarity switching between negative and positive over time, to the charge roller 56 which rotates upon rotation of the transport belt 51.

The recording sheet 42 reaching the entrance nip is attracted to the charged surface of the transport belt 51 with a leading edge thereof guided by the edge guide 47 and pressed against the belt surface by the roller assembly 48. As the transport belt 51 rotates, the recording sheet 42 is turned substantially 90 degrees and forwarded to the printer section in a substantially flat position.

In the printer section, the carriage 33 traverses the print zone in the main scan direction X in a reciprocating motion as the printheads 34 selectively activate their nozzles according to image data, while the transport belt 51 conveys the recording sheet 42 beneath the printheads 34 along the sub-scan direction Y in a stepped motion. Moving from one side to the other of the print zone, the printheads 34 eject ink droplets across the recording sheet 42 while the transport belt 51 is at rest. When one swath of ink image is created, the transport belt 51 advances the recording sheet 42 by a given amount and stops. The printhead 34 then forms another swath of ink image in a succeeding portion of the recording sheet 42, and such a process is repeated until an end signal is transmitted and/or until a trailing end of the sheet 42 reaches the print zone.

When duplex printing is intended, the transport belt 51 rotates in the opposite direction to introduce the recording sheet 42 into the sheet reversing unit 71. The sheet reversing unit 71 turns over the incoming sheet 42 for re-feeding to the entrance nip, and the same process is repeated to print an ink image on the reverse side of the recording sheet 42.

After printing, the recording sheet 42 bearing an ink image thereon advances to the output unit, stripped from the transport belt 51 by the sheet separator 61, and ejected by the ejection roller 62 and the spur 63 downward to the output tray 3. In the printer section, the carriage 33 moves aside the print zone to an initial position in which the nozzle faces meet the maintenance station 81, and rests in the initial position anchored by the carriage lock 87.

The maintenance station 81 performs various maintenance/recovery procedures to maintain and recover a proper condition of the nozzles and ensure reliable performance of the printhead 34. Such procedures include sucking nozzles clear with the nozzle caps 82*ck* and 82*ym*, wiping the nozzle faces with the wiper blade 83, firing the nozzles to discharge dried viscous ink into the first spittoon 84 for disposal into the waste tank 100, removing ink residue accumulated on the wiper blade 83 by applying the cleaner member 85 with the blade cleaner 86, etc. Such recovery procedure may also be performed during printing, where the nozzles are fired to discharge dried viscous ink into the second spittoon 88 beside the print zone.

Figure 2A:
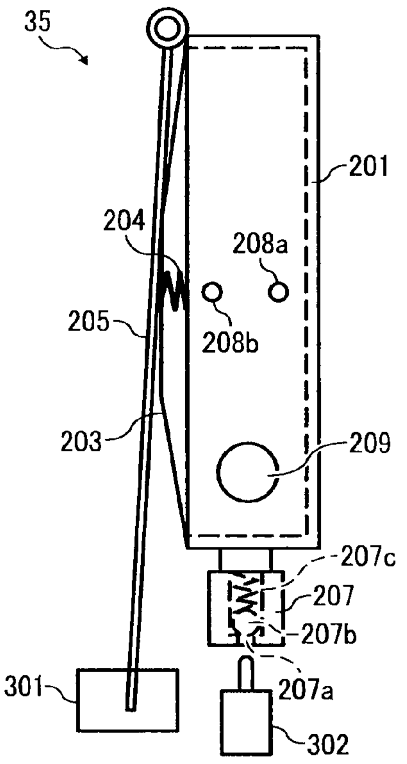
FIGS. 2A and 2B are top side and front perspective sectional views, respectively, schematically illustrating an ink container or subtank employed in the image forming apparatus of FIGS. 1A and 1B.
Figure 2B:
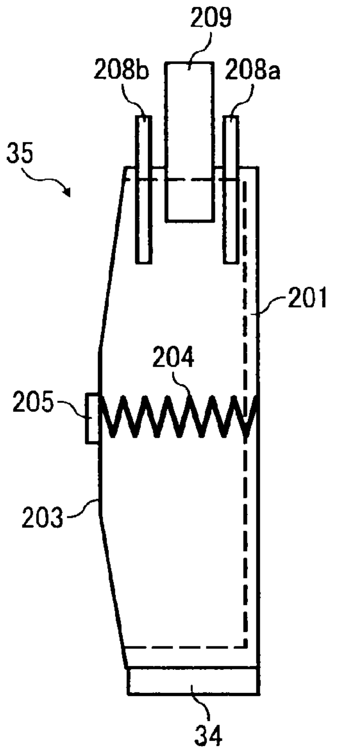

FIGS. 2A and 2B are top side and front perspective sectional views, respectively, schematically illustrating the ink container or subtank 35 employed in the image forming apparatus 1 according to one embodiment of this patent specification.

As shown in FIGS. 2A and 2B, the subtank 35 includes an open-sided rectangular body 201 having two relatively broad parallel lateral sides, one open and the other closed, and four relatively narrow sides perpendicular to the lateral sides. The open lateral side of the tank body 201 is covered and sealed with an elastic film 203 to define a hermetically sealed chamber for holding ink liquid, not shown. Within the ink chamber, a resilient member or spring 204 is disposed to bias the elastic film 203 away from the closed lateral side of the tank body 201.

The tank body 201 has an inlet port 209 on the top side for deriving ink from the ink cartridge 10 via the supply tube 36, not shown, and an outlet port on the bottom side for supplying ink to the printhead 34. On the front side of the tank body 201 is a spring-loaded ventilation valve 207 normally closed with a spring 207*c* urging a valve body 207*b* to block a valve port 207*a*. Facing a solenoid 302 disposed on the carriage 33, the ventilation valve 207 opens when the solenoid 302 presses the valve body 207*b* against the spring 207*c* to allow air passage through the valve port 207*a*.

The subtank 35 also has an elongated feeler or rod 205 on the sealed lateral side of the tank body 201, which is operatively associated with an optical sensor 301 mounted on the apparatus body. The feeler rod 205 is held with one end pivotably secured to an edge of the tank body 201, the middle bonded to the sealing film 203, and the other end pointing toward the optical sensor 301.

In addition, the subtank 35 is equipped with a pair of electrodes 208*a* and 208*b* extending from the top side of the tank body 201 with their lower ends terminating at a set level inside the ink chamber, normally immersed in the contained ink. While not illustrated in the drawing, the electrodes 208*a* and 208*b* are connected to an ohmmeter or air leak sensor 303 (shown in FIG. 3) and a suitable current source, exchanging signals with control circuitry 500 of the image forming apparatus 1 according to this patent specification.

In use, the subtank 35 has its ink chamber filled with ink and hermetically sealed with the inlet port 209 and the ventilation valve 207 both remaining closed. As ink is consumed by the printhead 34 ejecting ink, the optical sensor 301 detects displacement of the feeler rod 205 moving in conjunction with the elastic film 203 which bends inward slightly as ink is discharged from the ink chamber, thereby sensing an ink level remaining in the ink chamber as well as a quantity of ink to be supplied from the ink cartridge 10 for refilling the ink chamber.

To refill the ink chamber, the subtank 35 opens the ventilation valve 207 and the inlet port 209, receives ink via the inlet port 209, and closes the valve 207 and the port 209 as the ink chamber becomes full of ink. After refilling the ink chamber, the subtank 35 discharges a certain amount of ink from the printhead 34 with the spring 204 maintaining an original volume of the ink chamber, so as to generate a negative pressure lower than atmospheric pressure within the ink chamber. Such depressurization prevents undesirable leakage of ink from the subtank 35, and provides proper ink ejection and good imaging quality of the image forming apparatus 1.

Although normally the depressurized ink chamber remains hermetically sealed against the atmosphere, there are some occasions where air leaks into the ink chamber, dissipating the negative pressure therewithin, and collects in a space above the fluid level of contained ink.

According to this patent specification, the air leak sensor 303 together with the electrodes 208*a* and 208*b* serve to detect an air leak or loss of negative pressure by detecting a reduction in fluid level within the ink chamber, which cannot be detected by the optical sensor 301 sensing movement of the pivoted rod 205. Upon detecting an air leak or pressure loss, the air leak sensor 303 signals the control circuitry 500 so as to depressurize the subtank 35 in the manner described above.

Specifically, in air leak detection, an electric current is applied between the electrodes 208*a* and 208*b* while the air leak sensor 303 monitors a resistance or conductivity therebetween. As the ink liquid conducts certain current between the electrodes 208*a* and 208*b*, the monitored resistance is normally low, and increases when the electrode ends are completely exposed to air. Thus, an increased resistance between the electrodes 208*a* and 208*b* indicates the ink level falling below the set level, or the amount of air leaking into the ink chamber exceeding a given allowable limit.

According to this patent specification, such air leak detection takes place prior to printing or any operation involving refilling of ink in which the presence of air inside the ink chamber can result in failure of pressure generation, such as reconditioning the printhead 34 by the maintenance station 81, refilling the subtank 35 from the ink cartridge 10, etc. Also, the air leak sensor 303 may be activated in response to any event that can cause a loss of negative pressure in the ink chamber, such as occurrence of failures in printing, in particular, interference on the carriage 33 and the printhead 34, power-on of the image forming apparatus 1, execution of an initial print job after extended periods of non-use, etc.

Figure 3:
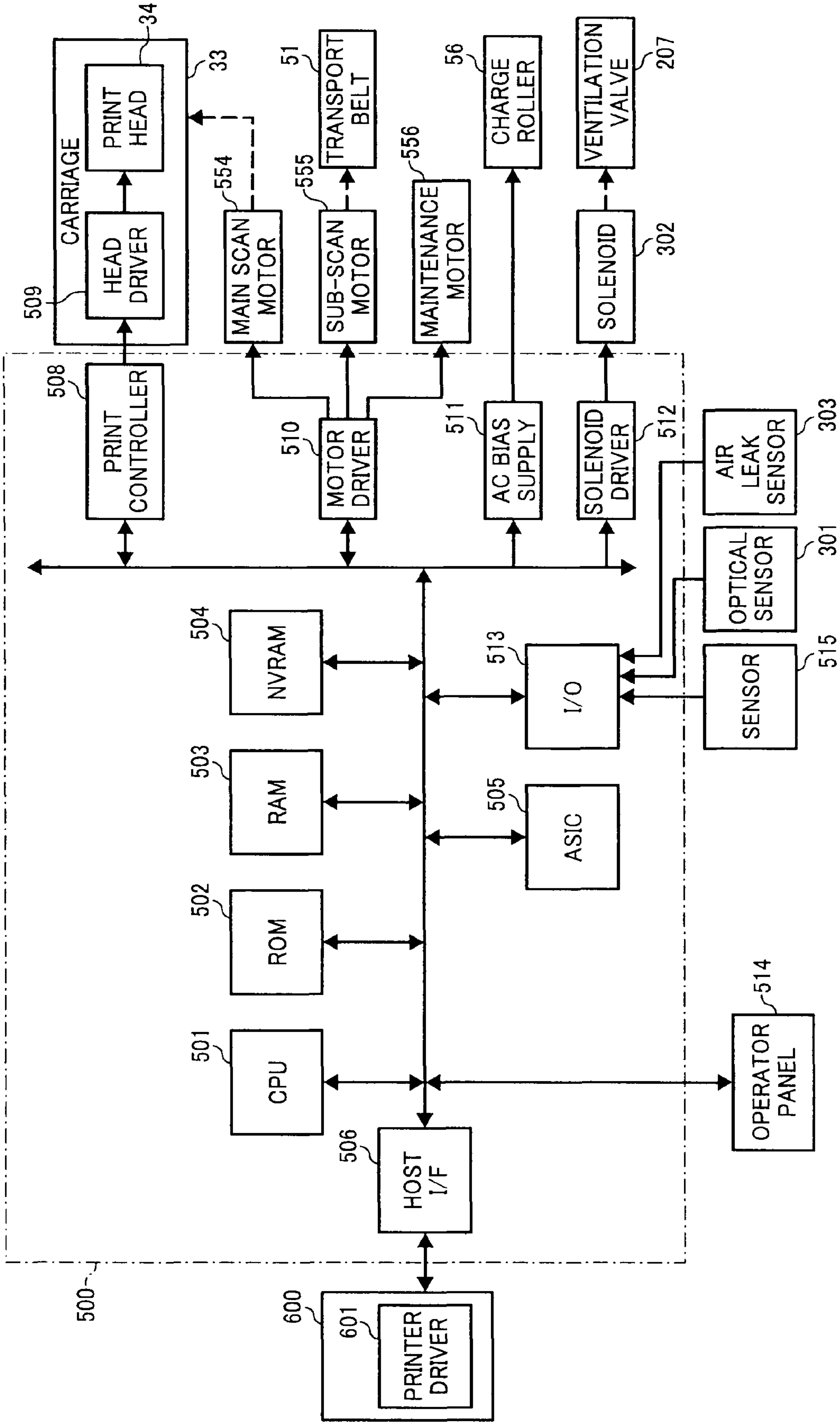
FIG. 3 is a block diagram illustrating control circuitry of the image forming apparatus of FIGS. 1A and 1B.

FIG. 3 is a block diagram illustrating the control circuitry 500 of the image forming apparatus 1.

As shown in FIG. 3, the control circuitry 500 includes a central processing unit (CPU) 501, a read-only memory (ROM) 502, a random-access memory (RAM) 503, a rewritable, non-volatile random access memory (NVRAM) 504, an application-specific integrated circuit (ASIC) 505, and a host interface 506 for performing general operation of the image forming apparatus 1, each connected to a common bus interfaced to an operator panel 514 that allows user input and display of data required to operate the image forming apparatus 1.

The control circuitry 500 also includes a print controller 508, a motor driver 510, a supply 511 of an alternating current (AC) bias, and a solenoid driver 512 for controlling or driving specific components of the image forming apparatus 1.

In the control circuitry 500, the CPU 501 controls overall operation of the image forming apparatus 1, with the ROM 502 storing various programs and certain unchangeable data for CPU execution, the RAM 503 temporarily storing image or other data during CPU execution, the NVRAM 504 retaining rewritable data during power-off, and the ASIC 505 processing and sorting image data and other input/output data for use by the CPU 501 controlling the image forming apparatus 1.

The host interface 506 exchanges data and signals via a cable or network with a printer driver 601 provided on a host computer 600, such as a personal computer, an image scanner, a digital camera, etc., which can process, scan, and/or capture raw image data to generate rasterized image data for printing by the image forming apparatus 1.

The print controller 508 has data processing and transfer units to direct an integrated circuit or head driver 509 provided on the carriage 509 to drive the printhead 33. The motor driver 510 directs a main scan motor 554 to drive the carriage 33, a sun-scan motor 555 to drive the transport belt 51, and a maintenance motor 556 to drive the maintenance station 556, respectively. The AC bias supply 511 applies an AC bias to the charge roller 56. The solenoid driver 512 drives the solenoid 302 to open and close the ventilation valve 207.

In addition, the control circuitry 500 includes an input/output unit 513 as an interface to various sensors 515 provided in the image forming apparatus 1, such as an optical sensor to detect position of fed recording sheets, a thermistor to monitor temperature inside the machine, a voltmeter to monitor voltage applied to a charger, and an interlock switch to detect opening and closing of a cover. The input/output sensor 513 also interfaces the control circuitry 500 with the optical sensor 301 and the air leak sensor 303 provided on the subtank 35.

While not illustrated in the drawing, the control circuitry 500 also includes a timer and a real-time clock to measure an elapsed period of time, as well as a rewritable nonvolatile memory such as a battery backed-up RAM to retain specific information during power-off in addition to the NVRAM 504.

During operation, image data converted into a rasterized, printable form by the printer driver 601 enters the control circuitry 500 via the interface 506, which buffers the incoming data for processing by the CPU 501.

The CPU 501 reads out and analyzes the image data, and directs the ASIC 505 to perform necessary processing and sorting on the image data, and transmits the processed data to the print controller 508 for further processing. Based on the data transmitted, the print controller 508 generates data for controlling the printhead 34 and transmits it to the head driver 509 on the carriage 33, which in turn drives the printhead 34 to eject ink according to the image data.

Namely, the print controller 508 transmits image data to the head driver 509 in serial form, together with a clock signal, a latch signal, a control signal, etc., used for the transmission and/or reception of the serial data. The image data includes a waveform drive signal with multiple pulse trains each formed of identical or different pulses, generated by circuitry incorporating a digital-to-analog converter, a voltage amplifier, and a current amplifier performing conversion and amplification of given pulse patterns stored in ROM for drive signal generation.

Receiving serial data corresponding to a single swath of an image, the head driver 509 selectively applies drive pulses to actuators (e.g., piezoelectric elements) of the printhead 34, which then fire nozzles to eject droplets according to the image data. Selecting pulses forming the drive signal enables the fired nozzles to eject droplets of different sizes, such as small, medium, and large, thus forming an ink image with dots of variable sizes.

In addition, the control circuitry 500 receives various signals from the optical sensor 301, the air leak sensor 303, and other sensors 515 to control printing and other specific services of the image forming apparatus performed by the print controller 508, the motor driver 510, the AC bias supply 511, and the solenoid driver 512.

According to this patent specification, the control circuitry 500 described above incorporates a diagnostic system that can indicate a mechanical defect causing air leakage and loss of negative pressure in the ink container or subtank 35 upon detecting an increase in rate or frequency of air leakage.

In the diagnostic system, the NVRAM 504 records a detection count C representing a number of air leaks in the subtank 35 detected by the air leak sensor 303 during a given counting cycle. The counting cycle is initiated at a given start time $t_0$ and completed following a lapse of a given period of time Tt measured by the timer and the real-time clock provided in the control circuitry 500. Also, the NVRAM 504 stores historical data used by the CPU 501 to initiate a diagnosis, including time and results of previous diagnoses as well as operating records of the image forming apparatus, such as time of initial operation, time of replacement of each subtank, etc.

Upon completion of each counting cycle, the CPU 501 executes a diagnosis by comparing the detection count C against a given threshold value Ct, and indicates a defect in the subtank 35 to a user when the detection count C exceeds the given threshold value Ct. After each diagnosis, the NVRAM 504 stores time and results of the executed diagnosis as the historical data for later retrieval of the CPU 501.

Preferably, the diagnostic system automatically suspends printing and air leak detection until the defective condition is removed. This prevents ineffective regeneration of negative pressure in a leaky subtank and reduces amounts of ink and time wasted for recovery process. Alternatively, the diagnostic system may allow printing to continue and only provide indication of a defect to a user, who can then voluntarily repair or replace the defective part after completing immediate print jobs.

Further, the start time $t_0$ at which the counting cycle for each diagnosis starts depends on whether the diagnosis is an initial one (i.e., aimed at identifying an early defect in the subtank 35) or a recurrent one (i.e., aimed at identifying a defective and leaky state of the subtank 35 after use). For example, for an initial diagnosis, the start time to may coincide with initial operation of the image forming apparatus 1 or replacement of the subtank 35, and for a recurrent diagnosis, the start time to may coincide with completion of a previous counting cycle.

Furthermore, the counting cycle for each diagnosis is completed when the image forming apparatus 1 initially executes a print job after the period of time Tt has elapsed since the start time $t_0$. Namely, the completion of the counting cycle may be either prior to or subsequent to execution of an initial print job after the lapse of time Tt. In a configuration where the diagnostic system suspends printing and air leak detection upon detecting a subtank defect, completing the counting cycle prior to the initial print job prevents wasteful and ineffective regeneration of negative pressure in the defective subtank, whereas completing the counting cycle subsequent to the initial print job prevents the print job from being abandoned.

Figure 4:
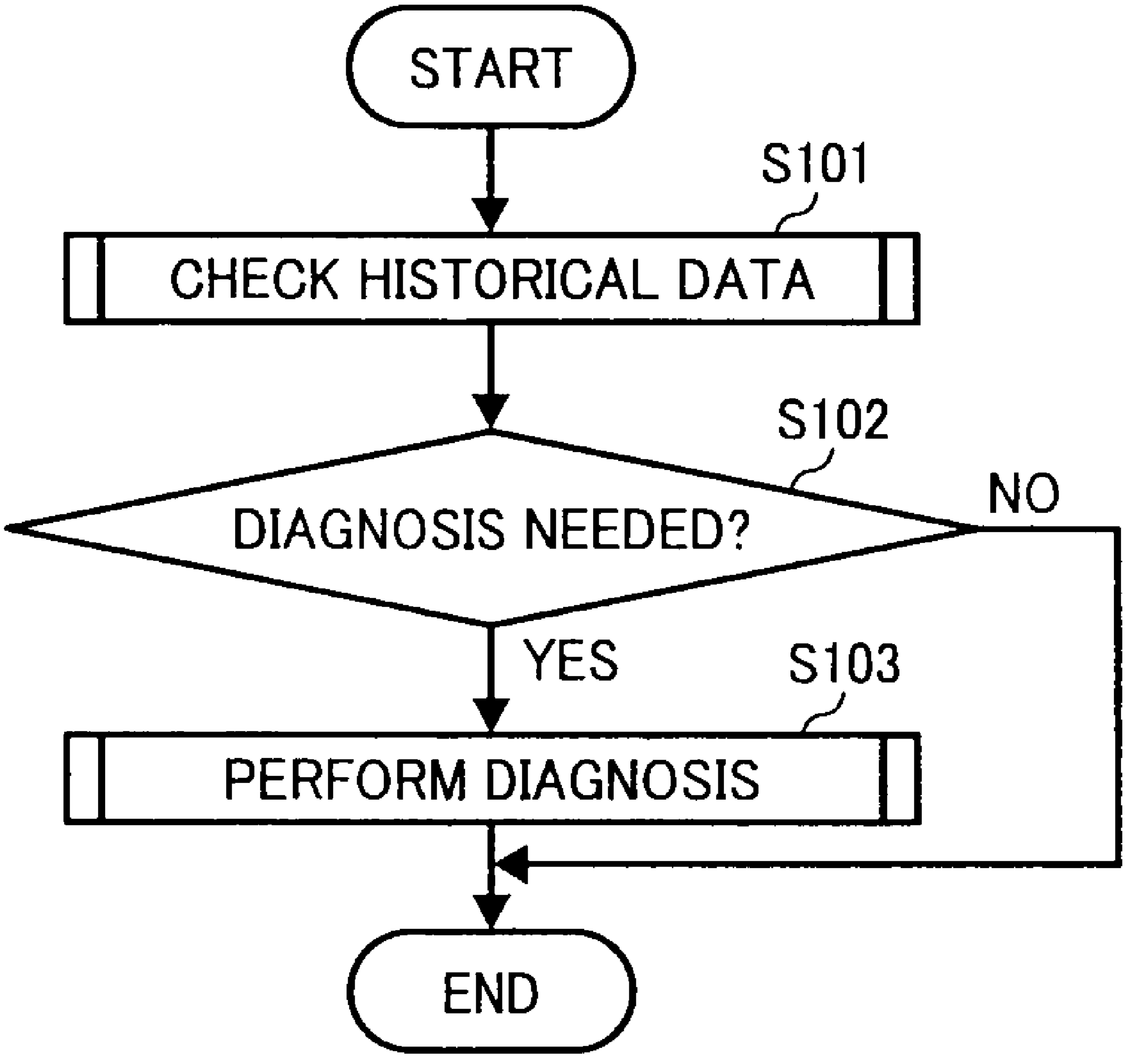
FIG. 4 is a flowchart outlining a diagnostic operation of the control circuitry of FIG. 3.

FIG. 4 is a flowchart outlining an operation of the diagnostic system or control circuitry 500 in the image forming apparatus 1.

As shown in FIG. 4, upon completion of a print job, the operation preliminarily determines necessity for an immediate diagnosis based on the historical data (step S101). When a diagnosis is needed ("YES" in step S102), the operation proceeds to a diagnostic procedure so as to detect a possible defect in the subtank 35 (step S103). When no diagnosis is needed ("NO" in step S103), the operation completes without performing a diagnostic procedure.

Figure 5:
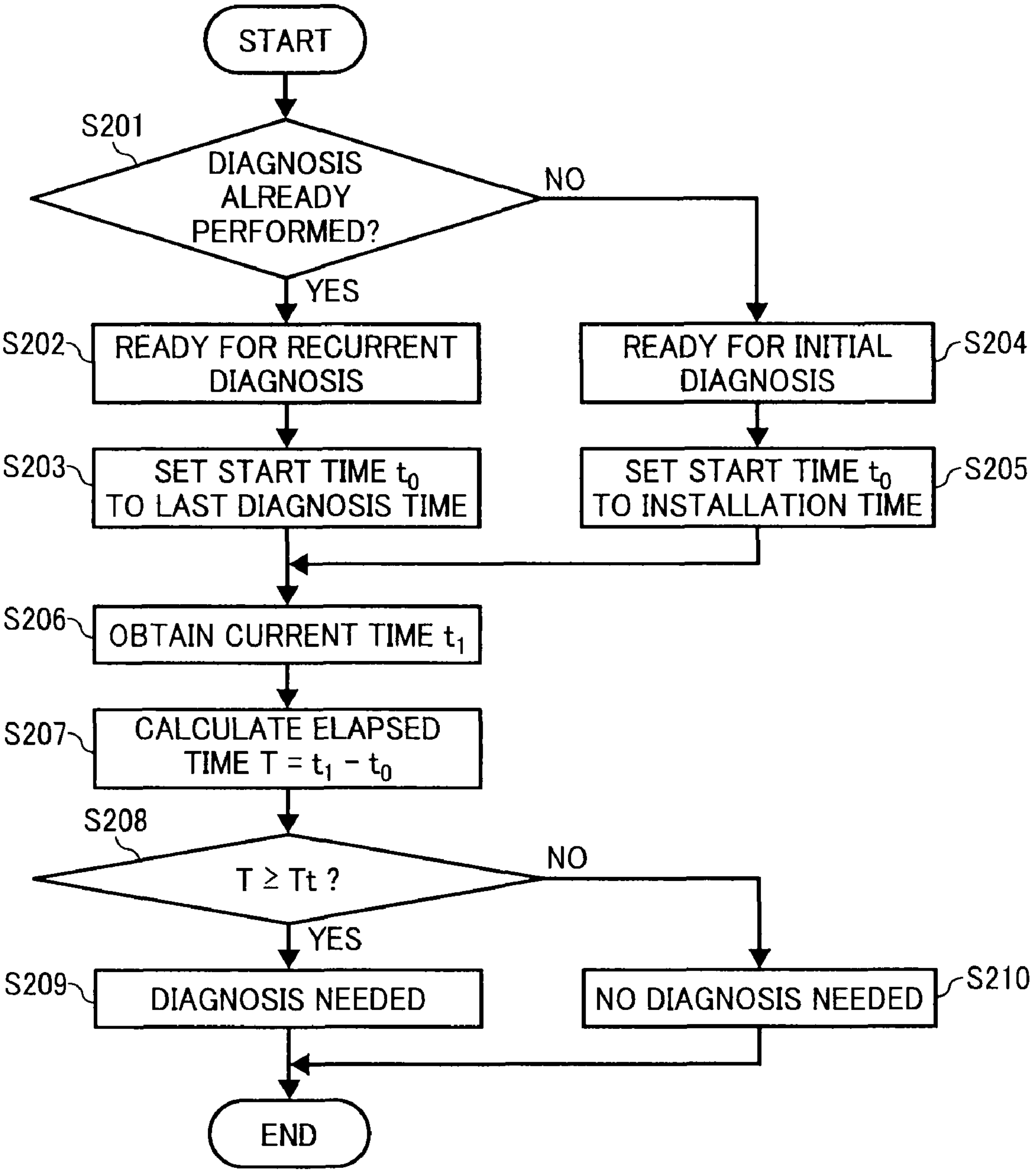
FIG. 5 is a flowchart illustrating in detail a pre-diagnostic procedure of the control circuitry outlined in FIG. 4.

FIG. 5 is a flowchart illustrating in detail a pre-diagnostic procedure of the diagnostic system or control circuitry 500, outlined in steps S101 and 102 of FIG. 4.

Initially, the operation retrieves the historical data to determine whether or not a diagnosis has already been performed since installation of the image forming apparatus 1 or replacement of the subtank 35 (step S201).

When no diagnosis has taken place for the subtank 35 ("NO" on step S201), the operation determines that the subtank 35 is ready for an initial diagnosis (step S204), and sets the start time $t_0$ to a point in time at which the image forming apparatus 1 was installed, or to a point in time at which the subtank 35 or assembly integral with the subtank 35 (e.g., the carriage 33) was replaced for repair or other purposes (step S205).

When one or more diagnoses have already been performed for the subtank 35 ("YES" on step S201), the operation determines that the subtank 35 is ready for a recurrent diagnosis (step S204), and sets the start time $t_0$ to a point in time at which the subtank 35 previously underwent a diagnosis (step S203).

After setting the start time $t_0$, the operation obtains a current time $t_1$ from the real-time clock (step S206), calculates an elapsed time T by subtracting $t_0$ from $t_1$ (step S207), and compares the elapsed time T against the given threshold time Tt (step S208). The time threshold Tt may be varied depending on whether the diagnosis is an initial one or not, for example, 10 days for an initial diagnosis and 30 days for a recurrent diagnosis. Setting a shorter threshold time for an initial counting cycle leads to an early initial diagnosis and detection of a possible subtank defect at an early stage after installation.

When T≧Tt ("YES" in step S208), which indicates completion of a counting cycle, the operation determines that the subtank 35 needs an immediate diagnosis (step S209), and proceeds to a diagnostic procedure. When T<Tt ("NO" in step S208), the operation determines that the subtank 35 needs no immediate diagnosis (step S210).

Figure 6:
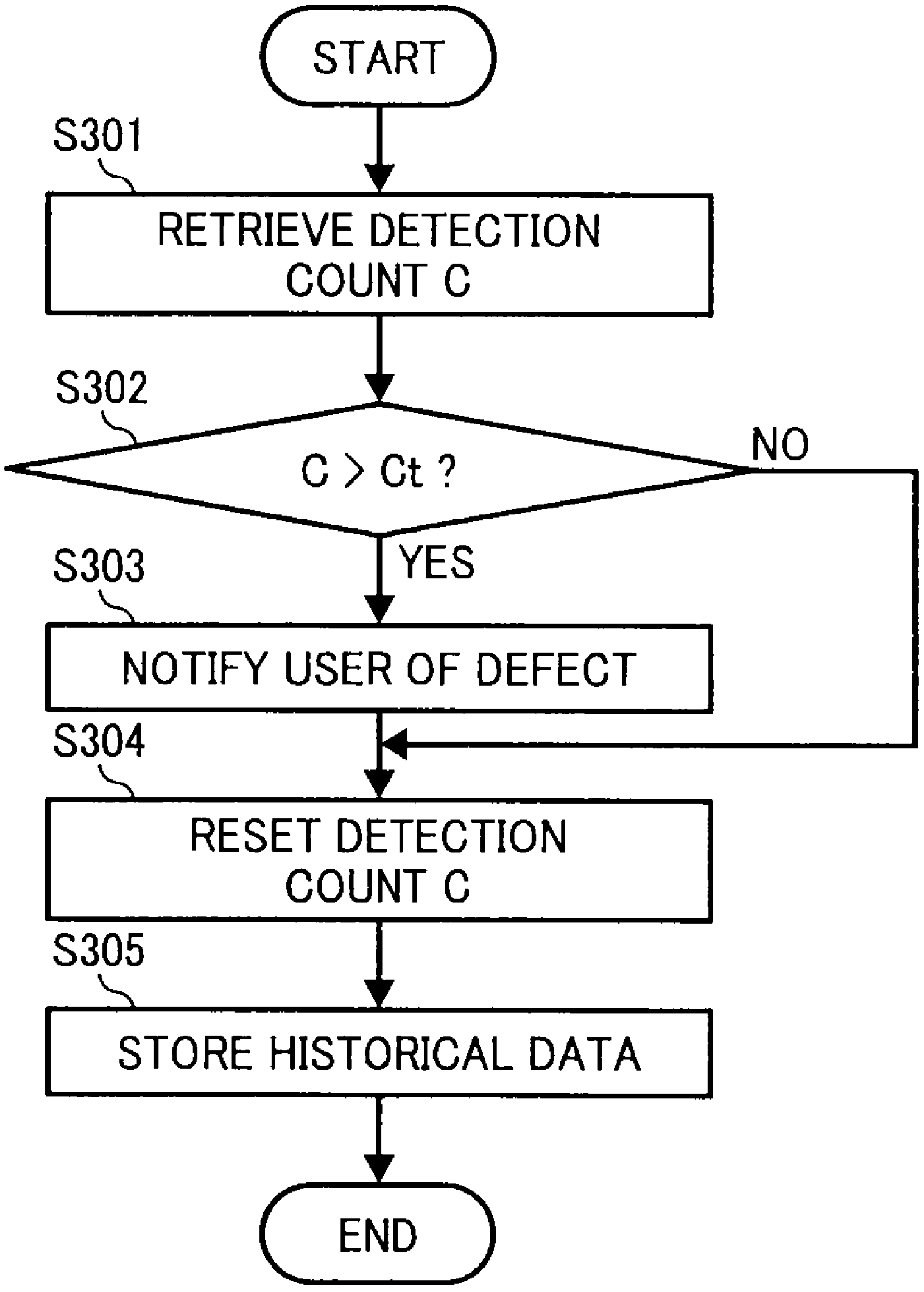
FIG. 6 is a flowchart illustrating an example of a diagnostic procedure of the control circuitry outlined in FIG. 4.

FIG. 6 is a flowchart illustrating an example of a diagnostic procedure of the diagnostic system or control circuitry 500, outlined in step S103 of FIG. 4.

Upon completion of a counting cycle, the operation retrieves the detection count C for the subtank 35 from the non-volatile memory (step S301).

The operation then compares the detection count C against the given threshold value Ct (step S302). The threshold value Ct may be either a fixed number, e.g., 30 detections, or a product of a fixed rate and a measured elapsed time, e.g., 30*X/720 detections derived from a rate of 30 detections per 720 hours and an elapsed time of X hours.

When C>Ct for a particular subtank 35*d* ("YES" in step S302), the operation determines that the subtank 35*d* is defective and provides a notification to the user (step S303). The user notification persists until the defective condition is remedied by replacing or repairing the defective subtank 35*d*, and may optionally be followed by automatic suspension of printing and air leak detection.

When C≦Ct for every subtank 35 ("NO" in step S302), or upon remedy of the defective condition, the operation resets the detection count C (step S304), and stores the results and time of the diagnosis as the historical data in the non-volatile memory (step S305).

Thus, the diagnostic system according to this patent specification can indicate a subtank defect upon detecting an increase in the rate of air leak detection in the ink container, indicated by the detection count C of air leaks exceeding the threshold value Ct. This enables the image forming apparatus 1 to suspend printing and air leak detection, preventing ineffective and costly regeneration of negative pressure in the defective subtank.

Figure 7:
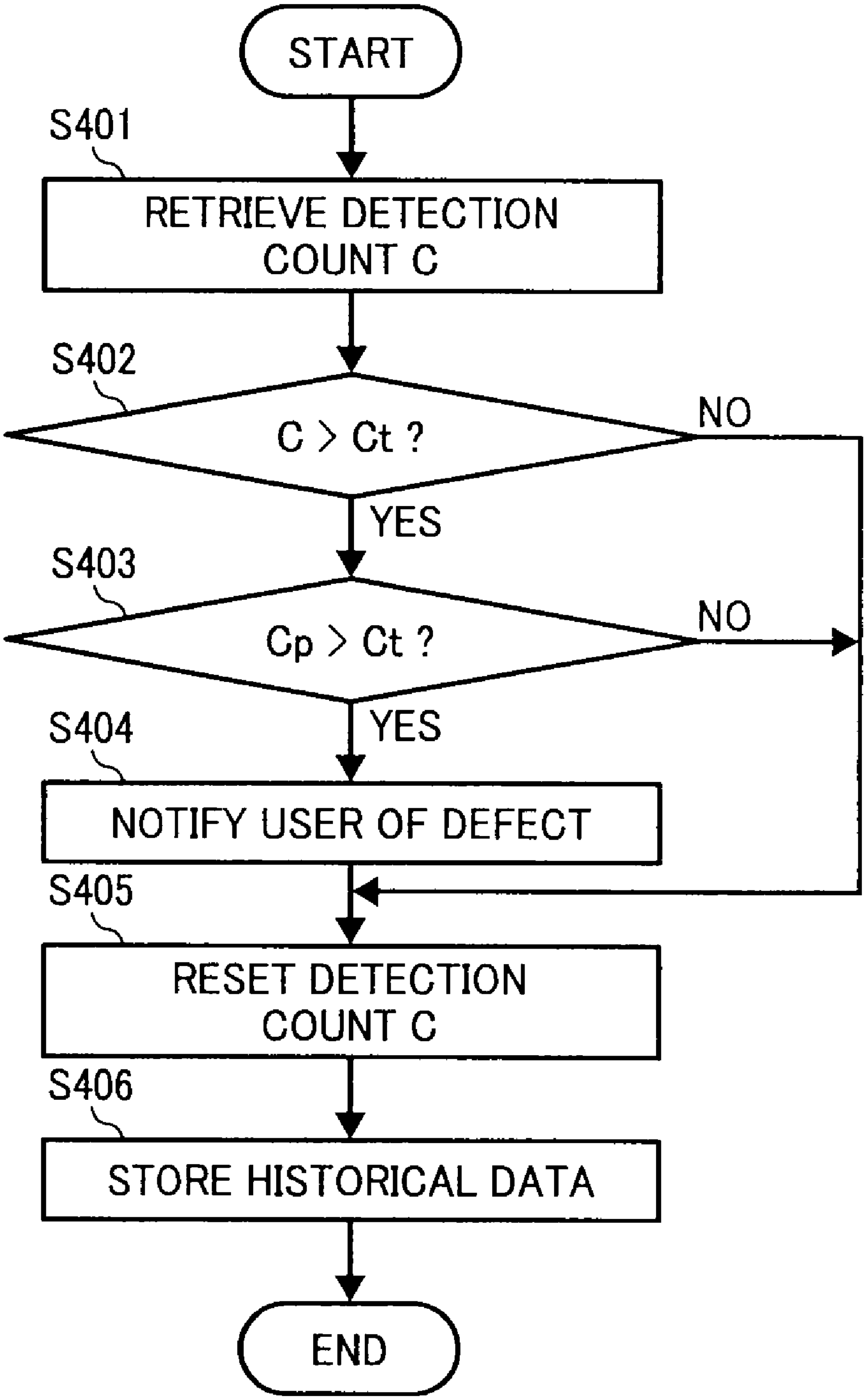
FIG. 7 is a flowchart illustrating another example of a diagnostic procedure of the control circuitry outlined in FIG. 4.

FIG. 7 is a flowchart illustrating another example of a diagnostic procedure of the diagnostic system or control circuitry 500, outlined in step S103 of FIG. 4.

Upon completion of a counting cycle, the operation retrieves the detection count C for the subtank 35 from the non-volatile memory (step S401).

The operation then compares the detection count C against the given threshold value Ct (step S402). The threshold value Ct may be either a fixed number, e.g., 30 detections, or a product of a fixed rate and a measured elapsed time, e.g., 30*X/720 detections derived from a rate of 30 detections per 720 hours and an elapsed time of X hours.

When C>Ct for a particular subtank 35*d* ("YES" in step S402), the operation then determines whether or not a detection count Cp obtained by the preceding counting cycle for the subtank 35*d* exceeds the threshold Ct (step S403).

When C>Ct and Cp>Ct, i.e., the two successive detection counts exceed the threshold Ct, for the subtank 35*d* ("YES" in step S403), the operation determines that the subtank 35*d* is defective and provides a notification to the user (step S404). The user notification persists until the defective condition is remedied by replacing or repairing the defective subtank 35*d*, and may optionally be followed by automatic suspension of printing and air leak detection.

When C≦Ct for every subtank 35 ("NO" in step S402), when C>Ct and Cp≦Ct for the subtank 35*d* ("NO" in step S403), or upon remedy of the defective condition, the operation resets the detection count C (step S405), and stores the results and time of the diagnosis as the historical data in the non-volatile memory (step S406).

Thus, the diagnostic system according to this patent specification can indicate a subtank defect upon detecting an increase in the rate of air leak detection in the ink container, indicated by the successive detection counts C and Cp of air leaks both exceeding the threshold value Ct. Compared to the configuration detecting a subtank defect based only on a current detection count, the embodiment using multiple detection counts prevents false detection of subtank defects where air leakage in the subtank temporarily becomes frequent, e.g., due to variation in environmental conditions under which the image forming apparatus is operated. In addition, although the embodiment above use two consecutive detection counts, the diagnostic system may perform defect detection based on three or more consecutive detection counts.

Numerous additional modifications and variations are possible in light of the above teachings. It is therefore to be understood that, within the scope of the appended claims, the disclosure of this patent specification may be practiced otherwise than as specifically described herein.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Still further, any of the aforementioned methods may be embodied in the form of a program. The program may be stored on a computer readable medium, and is adapted to perform any one of the aforementioned methods when run on a computer device (a device including a processor), such as the control circuitry 500 or the printer driver 601 of the host computer 600. Thus, the storage medium or computer readable medium, is adapted to store information and is adapted to interact with a data processing facility or computer device to perform the method of any of the above mentioned embodiments.

The storage medium may be a built-in medium installed inside a computer device main body, such as the ROM 502 of the control circuitry 500, or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to Floppy Disks®, cassette tapes, and removable hard disks; media with a built-in rewriteable non-volatile memory, including but not limited to memory cards; and media with a built-in ROM, including but not limited to ROM cassettes; etc.

For example, the program may be downloaded from a storage medium or from a network to the host computer 600 for installation on the control circuitry 500 of the image forming apparatus 1. The program may be run on the control circuitry 500 or on the printer driver 601 of the host computer 600.

Furthermore, although the embodiment above describes the image forming apparatus 1 as a simple inkjet printer, the diagnostic system according to this patent specification may be incorporated in a multifunctional machine with multiple image forming capabilities, such as faxing and copying, in addition to printing.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus, comprising:

a printhead to eject droplets of ink to form an ink image;

an ink container to supply ink to the printhead;

a sensor to detect an air leak in the ink container when an amount of air therewithin exceeds a given limit level, the ink container being depressurized to generate a negative pressure lower than atmospheric pressure upon detection of the air leak by the sensor, such that the amount of air therewithin falls below the given limit level;

a memory to record an air leak detection count representing a total number of times the sensor detects an air leak in the ink container during a given counting cycle initiated at a given start time and completed following a lapse of a given period of time; and a processor to compare the detection count against a given threshold value upon completion of the counting cycle, and indicate a defect in the ink container when the air leak detection count exceeds the given threshold value.

2. The image forming apparatus according to claim 1, wherein the start time coincides with at least one of initial operation of the image forming apparatus, completion of a previous counting cycle, and replacement of the ink container.

3. The image forming apparatus according to claim 1, wherein the counting cycle is completed either prior to or subsequent to execution of an initial print job following the lapse of the given period of time.

4. The image forming apparatus according to claim 1, wherein the sensor is activated at least one of immediately before refilling the ink container, immediately before reconditioning the printhead, upon power-on of the image forming apparatus, immediately before execution of an initial print job after a given period of no use, and upon detection of an interference on the printhead.

5. The image forming apparatus according to claim 1, wherein, in response to the indication of the defect in the ink container, the processor suspends a printing operation.

6. The image forming apparatus according to claim 1, wherein, in response to the indication of the defect in the ink container, the processor notifies a user of the defect and allows a printing operation to continue.

7. An image forming apparatus, comprising:

multiple printheads to eject droplets of ink to form an ink image;

multiple ink containers to supply ink to the respective printheads;

multiple sensors to detect an air leak in the respective ink containers when an amount of air therewithin exceeds a given limit level, each of the multiple ink containers being depressurized to generate a negative pressure lower than atmospheric pressure upon detection of the air leak by the sensor, such that the amount of air therewithin falls below the given limit level;

a memory to record an air leak detection count representing a total number of times the sensor detects an air leak in each of the multiple ink containers during a given counting cycle initiated at a given start time and completed following a lapse of a given period of time; and a processor to compare the detection count against a given threshold value upon completion of the counting cycle, and indicate a defect in the ink container when the air leak detection count exceeds the given threshold value.

8. An image forming apparatus, comprising:

a printhead to eject droplets of ink to form an ink image;

an ink container to supply ink to the printhead;

a sensor to detect an air leak in the ink container when an amount of air therewithin exceeds a given limit level, the ink container being depressurized to generate a negative pressure lower than atmospheric pressure upon detection of the air leak by the sensor, such that the amount of air therewithin falls below the given limit level;

a memory to record an air leak detection count representing a total number of times the sensor detects an air leak in the ink container during a given counting cycle initiated at a given start time and completed following a lapse of a given period of time; and a processor to compare the detection count against a given threshold value upon completion of the counting cycle, and indicate a defect in the ink container when multiple air leak detection counts obtained through successive counting cycles exceed the given threshold value.

* * * * *